United States Patent [19]

Baumann

[11] Patent Number: 4,591,011
[45] Date of Patent: May 27, 1986

[54] BALANCE WITH CLOCK-LIKE DISPLAY

[75] Inventor: Arthur Baumann, Bertschikon, Switzerland

[73] Assignee: Mettler Instrumente AG, Greifensee-Zurich, Switzerland

[21] Appl. No.: 569,173

[22] Filed: Jan. 9, 1984

[30] Foreign Application Priority Data

Jun. 10, 1983 [CH] Switzerland ............... 3196/83

[51] Int. Cl.⁴ .................... G01G 13/02; G01G 23/14
[52] U.S. Cl. ................................ 177/122; 177/164; 177/173
[58] Field of Search ............... 177/122, 123, 164, 173, 177/3

[56] References Cited

U.S. PATENT DOCUMENTS

| | | | |
|---|---|---|---|
| 942,942 | 12/1909 | Sonander | 177/122 |
| 2,121,227 | 6/1938 | Haegele | 177/3 X |
| 2,926,010 | 2/1960 | Kennaway et al. | 177/164 X |
| 3,266,583 | 8/1966 | Hale | 177/173 X |
| 3,407,890 | 10/1968 | Fellows | 177/164 X |
| 3,422,916 | 1/1969 | Muller | 177/122 |

Primary Examiner—E. A. Goldberg
Assistant Examiner—Patrick W. Foster
Attorney, Agent, or Firm—Erwin S. Teltscher

[57] ABSTRACT

An optical display is provided to guide the operator during metering of a substance to a desired value. The desired value is entered into a computer and the substance to be metered is applied to a balance. The display is in the form of a clock having a coarse and fine indicator hand. During the coarse metering at the start of the metering cycle, the coarse metering hand is rotated at a first rotational speed relative to the metering rate, i.e. the rate at which the substance is being applied to the balance. During the fine metering phase, namely when the weight on the balance approaches the desired weight, either the same or another hand moves at a rotational speed relative to the metering rate which exceeds the first rotational speed, thereby expanding the sector over which the hand moves while a given amount of the substance is being applied. This greatly facilitates the operator's control over the process and decreases the possibilities that excess weight is added.

20 Claims, 6 Drawing Figures

BALANCE WITH CLOCK-LIKE DISPLAY

Cross reference to related applications and publications

U.S. application Ser. No. 569,175, based on Swiss Application No. 3197/83-9; having the same inventor and assignee, and filed simultaneously herewith.

FIELD OF THE INVENTION

The present invention relates to precision balances and, more particularly, to balances used to meter a substance to a desired value. In particular, it relates to balances furnishing a non-numeric or analog display indicative of the then-present weight of the substance on the scale during the metering process.

BACKGROUND OF THE INVENTION

A number of publications disclose methods for analog display of the weight of the substance being metered, and balances into which such methods are incorporated. For example, German Published Application No. 23 36 045 describes a balance which, besides the usual numeric display, has a non-numeric display indicating which part of the weighing range has already been used, or which part is still available. A similar balance is described in German Patent No. 26 04 747. In this patent, strips of light-emitting material are used to form symbols. However, neither of these balances has a display which actually assists the user in metering predetermined amounts of a substance, unless, coincidentally, the amount to be metered is the same as the available weight range.

Another example is U.S. Pat. No. 4,200,896, This discloses a display having a seven segment indicator in which, when a non-numeric display is desired, only the horizontal segments are activated. As the weight of the substance to be metered increases, the position of the activated horizontal segment changes. This gives the operator an indication of the weight on the balance relative to the desired weight. This type of operation has the advantage that a separate, additional display is unnecessary. It has the disadvantage that the display changes only in a step-wise fashion with decimal steps. Further, it requires greater concentration and effort on the part of the operator to adjust the addition of material to the balance to the logarithmic display change characteristic. These comments apply also to another known method (German Published Application No. 27 02 842) in which the steps are also decimal steps, a non-numeric display with light emitting elements being furnished in addition to the conventional numeric display.

Finally, German Published Application No. 29 23 215 discloses a display consisting of two concentric circles, each formed by a plurality of point sources of light (e.g. light emitting diodes). Each circle is indicative of a particular decimal place or group of decimal places. The light emitting diodes are activated in accordance with the then present weight on the balance, the latter being computed by counting of the activated diodes.

SUMMARY OF THE INVENTION

It is an object of the present invention to disclose a balance having a display giving an optimum, unequivocal indication to the operator of the actual weight on the scale during a metering process. The metering process is to be understood as generally signifying the addition of a substance to the balance. However, it should also be possible to accommodate a lessening of weight, i.e. the removal of the substance or a part thereof from the scale.

In accordance with the method of the present invention, a clock-shaped display is created in which a first hand rotates at a first rotational speed relative to the metering rate during a coarse metering phase and a second hand rotates at a second, increased rotational speed during the fine metering phase of the metering cycle. In other words, the sensitivity of the display is changed, the range of weight near the desired value being expanded. The operator can thus add substance to the balance very rapidly during the first, coarse phase of the metering process, slowing up as the desired value is approached. This type of "picture" of the metering process as it progresses allows the operator to make maximum use of his time. It results in a noticeable increase in the speed in which the operation is carried out, without increasing the risk of overfilling, since the pictorial representation in the form of the movement of the hand of a clock is particularly simple for an operator to interpret.

In an alternative embodiment, a single hand is used. The hand may, for example, move slowly while rotating through a first sector (e.g. a quadrant) during the coarse metering phase, while rotating more rapidly through a second sector (e.g. the two following quadrants) during fine metering. This embodiment has the advantage that the operator must watch only a single hand. It has the disadvantage that for a single metering process only 360 degrees of rotation are available, if multiple rotations are to be ommitted as being too confusing.

In the preferred embodiment of the invention two hands are provided. The first hand (coarse indicator) moves constantly at a first rotational speed, while the other hand (fine metering indicator) moves only towards the end of the metering process and at a second rotational speed. Preferably both hands rotate through a predetermined circular sector during the complete metering process, regardless of the desired value of the weight to which the substance is being metered. The operator can then become accustomed to the same position of the hand regardless of the desired full weight. Both hands may start at the same starting position and rotate through an equally large sector, one after the other.

The two hands may rotate in the same direction, similarly to the hour and minute hand of a standard clock. It is of course also conceivable that they rotate in opposite directions. It may also be desirable to furnish a numeric display of the desired weight at regular intervals. This allows the operator to determine which of a number of components is currently being added.

The balance according to the present invention has a clock-shaped display which has at least one hand. It further has a circuit which generates two different rotational rates relative to the metering rate for the hand or hands during a complete metering cycle.

Preferably, two hands are provided, one hand acting as an indicator during the coarse metering phase and a second hand acting as an indicator during the fine metering phase. The first indicator may be similar to the hour hand on a clock, while the second, fine indicator may be similar to the portion of a minute hand near the periphery of the clock. Since the path to be traversed by the hand acting as a fine indicator is thus the longest, a greater resolution is provided for fine metering than for coarse metering.

A tolerance range may be indicated on the display. If, for example, metering to plus or minus one percent is acceptable, this may be indicated by opitcal markings arranged symmetrically to the desired value. Such markings also allow the extent of over or under application of the substance to the balance to be estimated.

The novel features which are considered as characteristic for the invention are set forth in particular in the appended claims. The invention itself, however, both as to its construction and its method of operation, together with additional objects and advantages thereof will best be understood from the following description of specific embodiments when read in connection with the accompanying drawing.

DESCRIPTION OF THE PREFERRED EMBODIMENTS

The embodiments of the present invention all utilize a balance as a measuring instrument.

Figure 1:
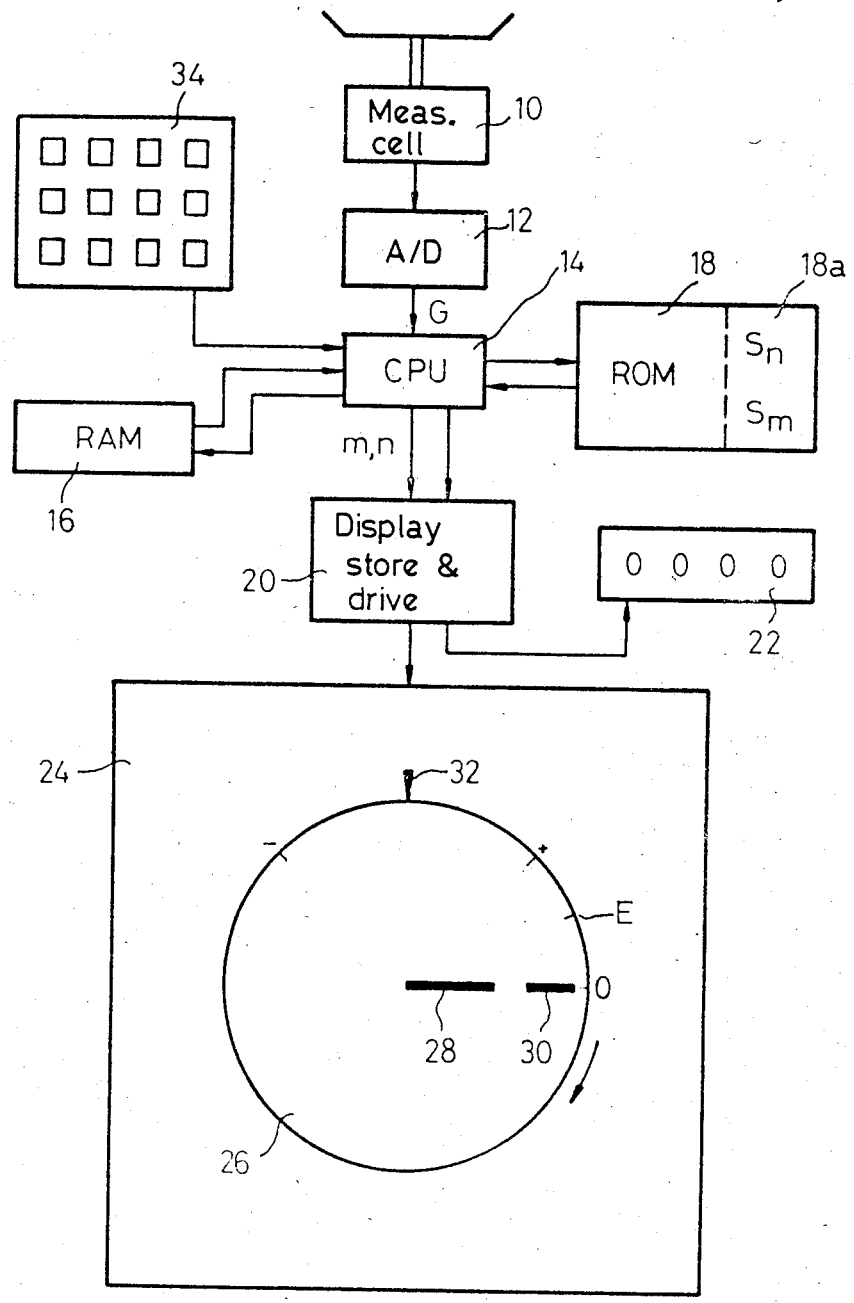
FIG. 1 is a schematic block diagram of the balance of the present invention with enlarged display.

Referring now to FIG. 1, in a balance, a measuring cell delivers a signal which is converted into a digital weight proportional signal G in a signal processor 12. The signal G is applied to a microcomputer. The latter comprises a central processing unit (CPU) 14, a random access memory (RAM) 16 and a read only memory (ROM) 18. The output of CPU 14 is applied to the input of a conventional display storage and drive circuit 20. The latter drives a conventional digital display 22 and the pictorial display 24 of the present invention. Display 24 comprises a substantially circular surface 26, a first indicator hand 28 (coarse indicator) which extends radially from the center for about two-thirds of the distance to the periphery, and a second indicator hand 30 (fine indicator) which also extends in a radial direction, but over about one-third of the way from the periphery to the center of the circle. The "twelve o'clock" position is marked by a mark 32. To the right and left of mark 32 and at equal distances therefrom are a "plus" mark and a "minus" mark to indicate an allowable tolerance. If appropriate for a given application, these marks may also be at unequal distances from mark 32.

A keyboard 34 is provided to allow the entry of numerical values and control signals. When balance 10 is unloaded, or after taring or resetting to zero, both hands (28 and 30) are in the starting position shown in FIG. 1. As weight is added to the balance, hand 28 rotates slowly in the direction of the arrow until it reaches a position "five minutes to twelve" when ninety percent of the desired weight has been applied to the balance. This ends the coarse metering phase. Hand 30 now starts to move at a rotational speed approximately nine times that of hand 28 relative to the rate of weight addition. The movement also takes place in the direction of the arrow and constitutes the display during the fine metering phase.

When the desired value is reached, hands 28 and 30 are both aligned in the "twelve o'clock" position. Both hands have thus passed through three quadrants. The progression is shown in FIGS. 2 to 4.

Figure 2:
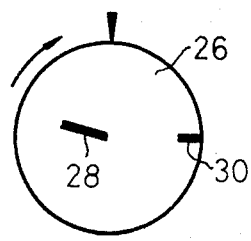
FIGS. 2, 3 and 4 are details of the display of FIG. 1.

Specifically:

In FIG. 2 the coarse metering phase is approximately three quarters complete. The fine indicator is still in the starting position.

Figure 3:
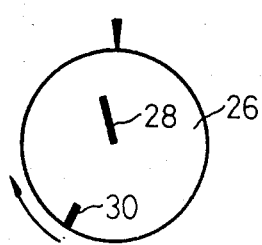
Figure 4:
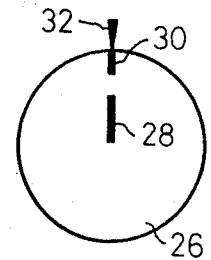

In FIG. 3 the coarse metering phase has ended and hand 30 has traversed about half of its total angle of rotation.

In FIG. 4 the desired value has been reached exactly. Both hands are in the position signifying the desired value, that is they are aligned at mark 32. The metering cycle for the particular substance is finished.

If additional weight were added to the substance, hands 28 and 30 would both continue to advance in the direction of the arrow at the two different rotational speeds. Therefore it is desirable to fix an end position, for example at "two o'clock", beyond which the hands will not advance even if more weight is added. This fixed end position should precede the starting position so that it cannot be confused with a display of weight less than the desired value. This excess weight region (here between "twelve o'clock" and "two o'clock") should be designated by an optical marking, for example by activation of additional display elements in this region.

In practice a small tolerance relative to the desired value is often permitted in order to speed up the metering process. The position of the "plus" and "minus" marks in FIG. 1 mark the boundaries of the allowable desired weight range, the position of hand 30 being determinative.

If the first metering cycle is to be followed by the addition of a further component, a tare process is carried out. This causes the numerical display 22 to return to its zero position simultaneously with the return of hands 28 and 30 to the starting position at "three o'clock." The new desired value may now be entered on the keyboard and the next metering cycle commences.

Figure 5:
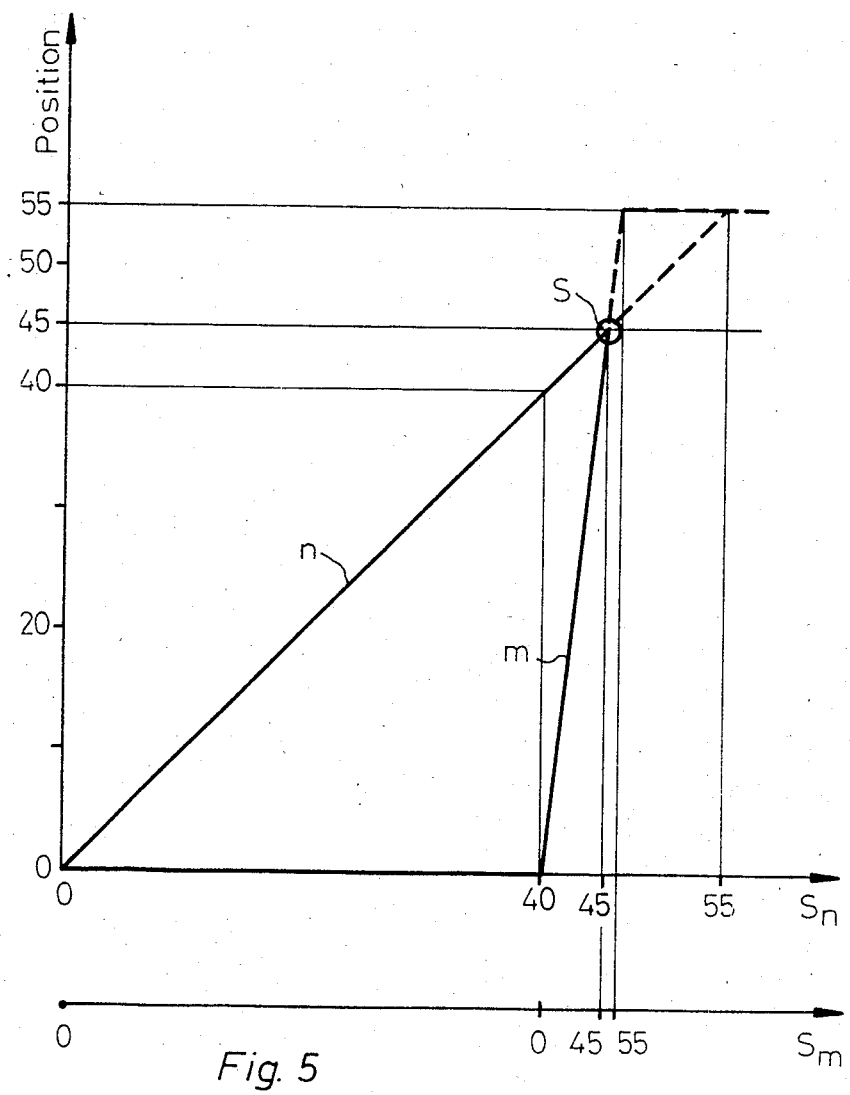
FIG. 5 is a graph of angle of rotation of the hands as a function of applied weight.

FIG. 5 is a graph illustrating the movement of the hands during the metering cycle. The explanation will be based on the conventional minute divisions in a clock.

During the coarse metering phase of the cycle, the coarse indicator hand 28 rotates through forty "minutes" starting at the starting position of fifteen "minutes." During this time, approximately ninety percent of the desired weight has been put on the scale. The fine indicator hand 30 then starts to move. It rotates through a sector of forty-five "minutes" during the fine metering phase, while hand 28 continues to run and passes through an additional five "minute" sector. During the fine metering phase approximately ten percent of the desired weight is added. At the end of the phase, the desired value, S, has been reached. FIG. 5 also shows an excess weight region. This corresponds to the dashed lines in the positions n of hand 28 and the positions m of hand 30. The excess weight region extends over a ten "minute" sector, that is the final position E of both hands is five "minutes" before the starting position. The exact significance of the abscissa unit ($S_n$, $S_m$) will become clear after the following explanation of the flow chart of FIG. 6 which controls the display.

Figure 6:
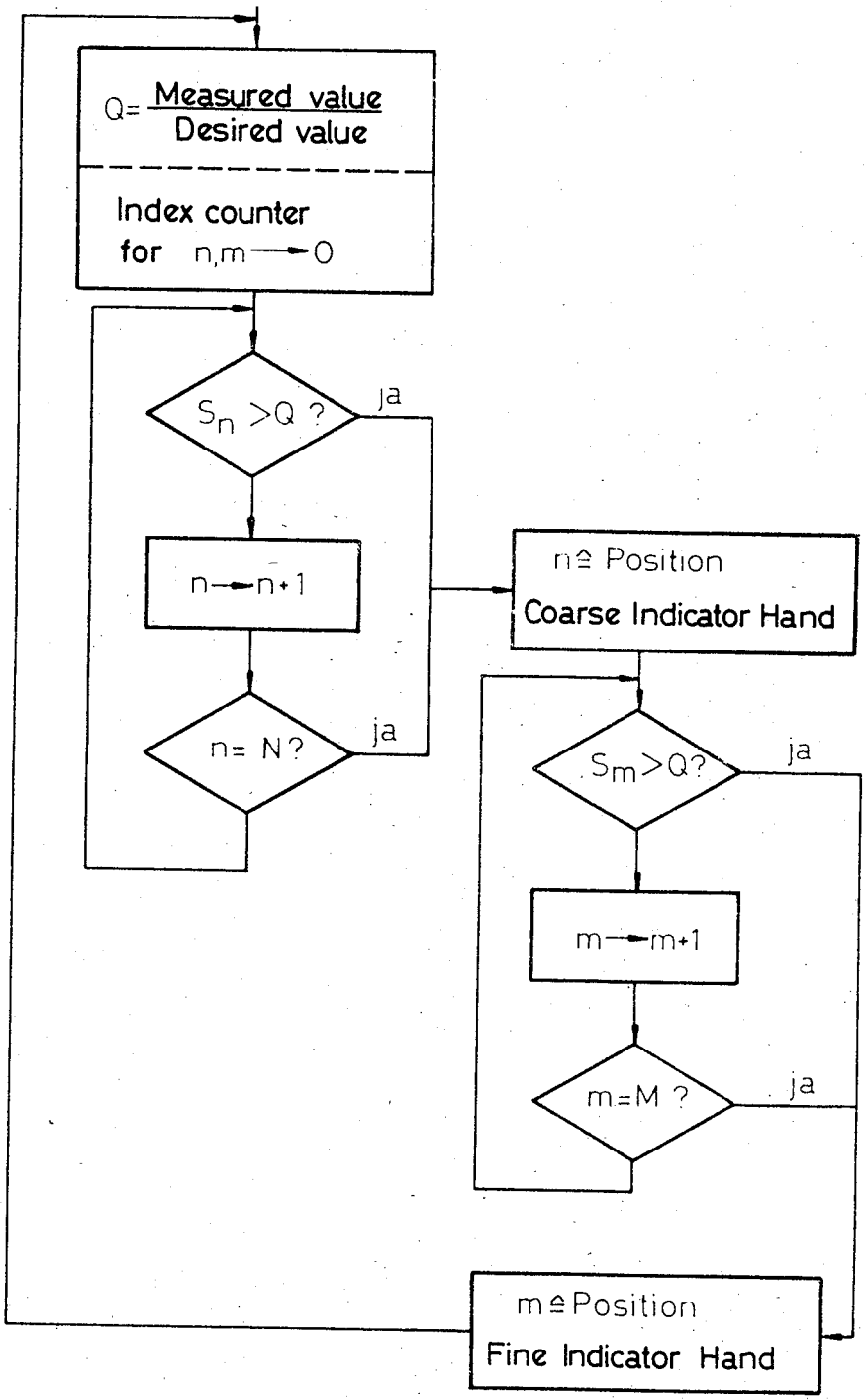
FIG. 6 is a flow chart for the computer of FIG. 1.

Referring now to FIG. 6, the desired weight is entered by means of keyboard 34 at the start of the metering cycle, and stored in storage 16. If necessary, this value can be recalled by activation of a key on keyboard 34. It is then displayed in digital display 22.

Storage 18 contains two tables of threshold values $S_0 \ldots S_{54}$ for, respectively, the coarse indicator hand 28 ($S_n$) and the fine indicator hand 30 ($S_m$). These are stored in storage section 18a. In each cycle, the following steps take place under control of the microcomputer:

The actual value of the weight on the scale (measured value) G of the net weight is entered.

Two index counters are reset to 0 (n for the coarse indicator hand, m for the fine indicator hand).

The quotient measured value/desired value is calculated and compared to the stored threshold values, first with $S_n$ and then with $S_m$. Each of the index counters is then advanced by one step until one of two conditions is reached: either the stored value ($S_n$, $S_m$) exceeds Q, in the region before the excess weight limiting value E is reached (see FIG. 1); or the last stored threshold value ($S_n$, $S_m$) is equal to or less than the value corresponding to the end position E of the indicator concerned (N, M).

The display storage and drive unit 20 is then controlled by CPU 14 in such a manner that first, the conventional numeric display 22 displays the actual measured value, and, secondly, the coarse and fine indicator hands are driven to the positions in display 24 which correspond to the threshold values $S_n$, $S_m$ selected above.

FIG. 5 illustrates the linear relationship between the movement of the hands and the percentage increase in weight. Other relationships can of course readily be implemented and may be appropriate in other cases. It should also be noted that in FIG. 5 the stored threshold values $S_n$, $S_m$ are indexed in accordance with the "minute" value of the corresponding indicator hand position. For example $S_{40}$ for the coarse indicator hand indicates a position of "five minutes to twelve," i.e. the hand has moved forty minutes from its starting position of fifteen minutes past the hour.

In practice, display 24 can be implemented in various ways, using active or passive types of display. For example: a fluorescent display can be utilized. This might have sixty selectively driveable luminous segments which extend radially behind circular surface 26 to constitute the coarse and fine indicator hands; or a liquid crystal display with vapor deposited electrodes.

The type of balance or measuring cell used is irrelevant as long as the signal signifying the actual weight is available in digital form. A number of variations and additions to the above described embodiment immediately come to mind. For example, an acoustic signal can be used to indicate to the operator that the fine metering phase has started. The numeric display could be integrated into the non-numeric display i.e. could be within, or preferably outside of the actual circular surface 26. The indicator hands need not rotate through a circular path. Surface 26 could be bounded by an ellipse. In some cases, the metering cycle might be divided into three phases, coarse, intermediate, and fine, with three indicator hands or, alternatively, with one indicator hand having three different rotational speeds. Also, the distance or sector traversed may be changed, as may the actual embodiment of the hand. For example, two equally long hands may be used. A further variable is the region in which both hands move simultaneously. In the example herein, the fine hand moved while the coarse hand moved through a "five minute" range. The overlap region may even be zero, that is the coarse hand can be in its final position and at rest before the fine indicator hand starts to move.

Finally, a balance could be provided in which the change from coarse to fine metering can take place at a percentage of the desired weight selectable by the operator. For example a control key could be furnished on the keyboard which allows a selection of either 80% or 95% of the desired value for initiation of the fine metering phase. This would of course require a more complicated program for the microcomputer.

While the invention has been illustrated in preferred embodiments, it is not to be limited to the circuits and structures shown, since many variations thereof will be evident to one skilled in the art and are intended to be encompassed in the present invention as set forth in the following claims.

I claim:

1. Apparatus for furnishing a visual display of the weight of a substance being metered to a desired weight value in a metering cycle having a coarse and a fine metering phase, comprising, in combination, first means for receiving said metered substance at a changeable rate of weight addition;

second means for creating a visual display in response to signals applied thereto; and third means interconnected between said first and said second means for applying signals creating a clock-like display to said second means, said clock-like display having a periphery, a central region, and single indicator means extending from said central region toward said periphery, said indicator means rotating at a first rotational speed during said coarse metering phase, and at a second speed higher than said first rotational speed during said fine metering phase relative to said rate of weight addition during said metering cycle, and means for changing said first rotational speed to said second rotational speed at a selectable percentage of said desired weight value.

2. Apparatus for furnishing a visual display of the weight of a substance being metered to a desired weight value in a metering cycle having a coarse and a fine metering phase, comprising, in combination, first means for receiving said metered substance at a changeable rate of weight addition;

second means for creating a visual display in response to signals applied thereto; and third means interconnected between said first and said second means for applying signals creating a clock-like display to said second means, said clock-like display having a periphery, a central region, and first and second hands extending from said central region toward said periphery, one of said hands rotating at a first rotational speed during said coarse metering phase, the other of said hands rotating at a second rotational speed higher than said first rotational speed during said fine metering phase relative to said rate of weight addition, but only towards the end of said metering cycle.

3. Apparatus as set forth in claim 2, further comprising means for changing said first rotational speed to said second rotational speed at a selectable percentage of said desired weight value.

4. Apparatus as set forth in claim 2, wherein said first and second hand each rotates through a predetermined rotational angle independent of said desired value during each metering cycle.

5. Apparatus as set forth in claim 4, wherein said first and second hand start at the same starting position and rotate one after the other through said predetermined rotational angle.

6. Apparatus as set forth in claim 2, wherein said first hand extends radially from said central region for a first predetermined length and said second hand extends radially from said periphery for a second predetermined length, said first and second predetermined lengths each being substantially less than the total radial distance from said central region to said periphery.

7. Apparatus as set forth in claim 1, further comprising optical markings on said periphery for defining a permissible tolerance of said desired value.

8. Method for furnishing a visual display of the weight of a substance being metered to a desired weight value at a changeable rate of weight addition in a metering cycle having a coarse and a fine metering phase, comprising the steps of
   creating weight signals indicative of the weight of the substance being metered, and
   creating a clock-like visual display in response to said weight signals, said clock-like display having a periphery, a central region, and single indicator means extending from said central region toward said periphery,
   rotating said indication means at a first rotational speed during said coarse metering phase, and at a second speed higher than said first rotational speed during said fine metering phase relative to said rate of weight addition during said metering cycle, and
   changing said first rotational speed to said second rotational speed at a selectable percentage of said desired weight value.

9. Method as set forth in claim 8, wherein said weight signals are digital signals.

10. Method for furnishing a visual display of the weight of a substance being metered to a desired value at a changeable rate of weight addition in a metering cycle having a coarse and a fine metering phase, comprising the steps of
    creating weight signals indicative of the weight of the substance being metered, and
    creating a clock-like visual display in response to said weight signals, said clock-like display having a periphery, a central region, and first and second hands extending from said central region toward said periphery,
    rotating said one of said hands at a first rotational speed during said coarse metering phase, and
    rotating the other of said hands at a second speed higher than said first rotational speed during said fine metering phase relative to said rate of weight addition during said metering cycle, but only towards the end of said metering cycle.

11. A method as set forth in claim 2, wherein said first and second hand rotate throughout the same predetermined sector during a metering cycle independent of said desired value.

12. A method as set forth in claim 11, wherein said first and second hand start at the same starting position and rotate through the same angle of rotation one after the other.

13. Apparatus as set forth in claim 1, wherein the signals applied to said second means are digital signals.

14. Apparatus as set forth in claim 13, wherein the applying signals creating said clock-like display are digital signals.

15. Apparatus as set forth in claim 2, further comprising means for starting said second rotational speed in dependence of a selectable percentage attainment of said desired value.

16. Method as set forth in claim 10, further comprising the step of changing said first rotational speed to said second rotational speed at a selectable percentage of said desired value.

17. Method as set forth in claim 8, wherein said indicator means rotate over the entire periphery during said metering cycle.

18. Method as set forth in claim 10, further comprising the step of selecting an end position on said periphery, and halting rotation of said hands upon reaching said end position.

19. Apparatus as set forth in claim 2, further comprising a third hand extending from said central region towards said periphery, and rotatable at a speed intermediate between said first and second rotational speeds.

20. Apparatus as set forth in claim 19, wherein said speed changing means comprise means for changing said first rotational speed to said third rotational speed, and said third rotational speed to said second rotational speed at respective selectable percentages of said desired weight values.

* * * * *